United States Patent
Flores, Jr.

(10) Patent No.: US 7,194,289 B1
(45) Date of Patent: Mar. 20, 2007

(54) CELL PHONE WITH MIRROR

(76) Inventor: Bart Flores, Jr., 8476 Montana Ave., Buena Park, CA (US) 90621

( * ) Notice: Subject to any disclaimer, the term of this patent is extended or adjusted under 35 U.S.C. 154(b) by 380 days.

(21) Appl. No.: 10/671,221

(22) Filed: Sep. 24, 2003

Related U.S. Application Data

(60) Provisional application No. 60/482,548, filed on Jun. 24, 2003.

(51) Int. Cl.
*H04M 1/00* (2006.01)

(52) U.S. Cl. .............. 455/575.1; 455/90.3; 379/433.01

(58) Field of Classification Search ............ 455/550.1, 455/575.1–575.8, 90.1, 90.3; 379/433.01, 379/433.1, 433.13
See application file for complete search history.

(56) References Cited

U.S. PATENT DOCUMENTS

| | | | | |
|---|---|---|---|---|
| 5,896,277 A | * | 4/1999 | Leon et al. | 361/814 |
| 5,983,083 A | * | 11/1999 | Horne | 455/575.3 |
| 6,625,425 B1 | * | 9/2003 | Hughes et al. | 455/90.3 |
| 6,788,551 B2 | * | 9/2004 | Takagi | 361/814 |
| 2002/0137537 A1 | * | 9/2002 | Watanabe | 455/550 |

* cited by examiner

*Primary Examiner*—Lee Nguyen
(74) *Attorney, Agent, or Firm*—MacPherson Kwok Chen & Heid LLP; Tom Chen

(57) ABSTRACT

A cell phone includes a separate back cover containing a mirror. The back cover is removed or detached from the cell phone to expose a mirror. The back cover can then be attached back to the cell phone or otherwise secured or it can be left unsecured so that the user can use the mirror. Once the user is finished using the mirror, the back cover is secured to the cell phone, thereby protecting the mirror from any possible damage.

12 Claims, 2 Drawing Sheets

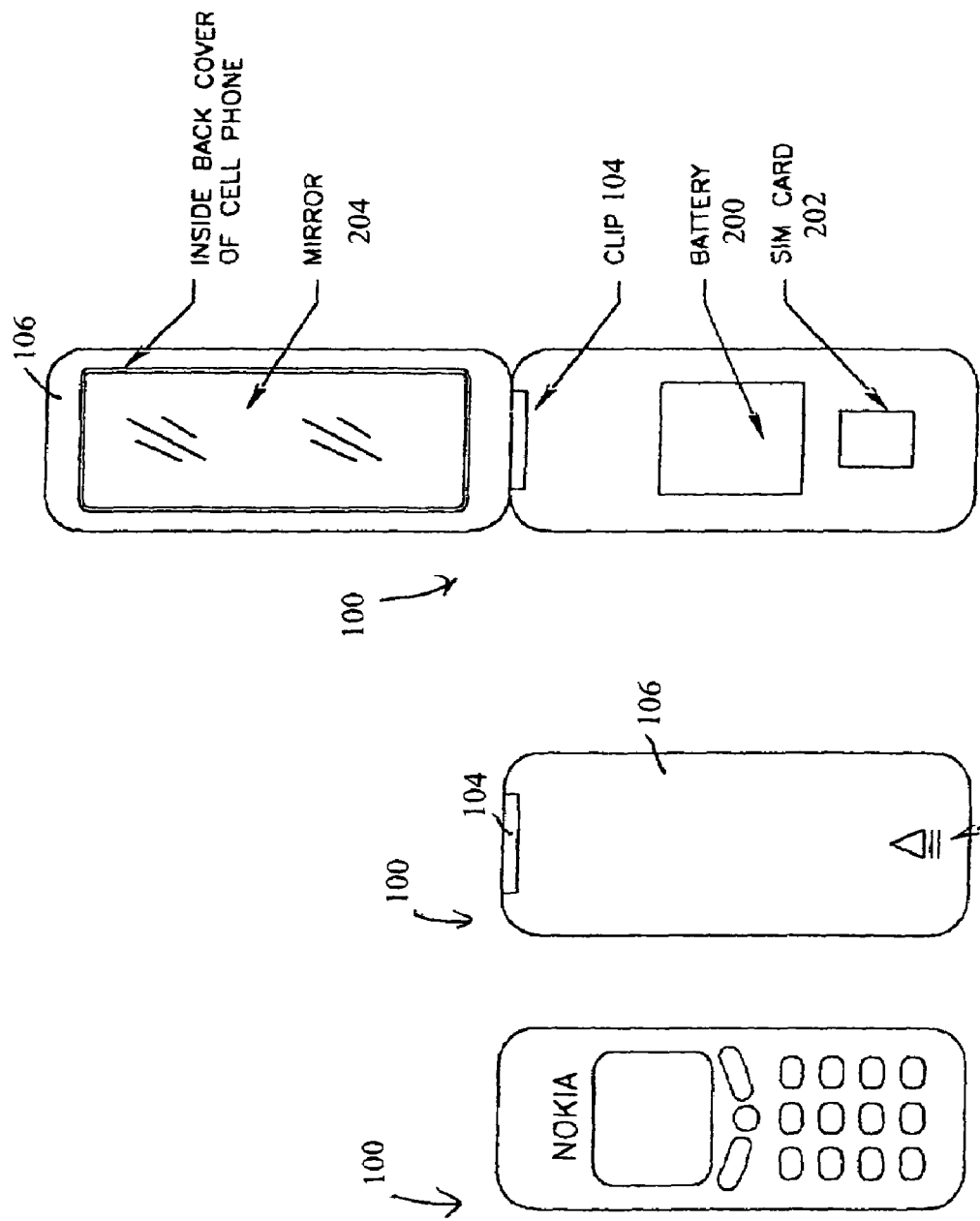

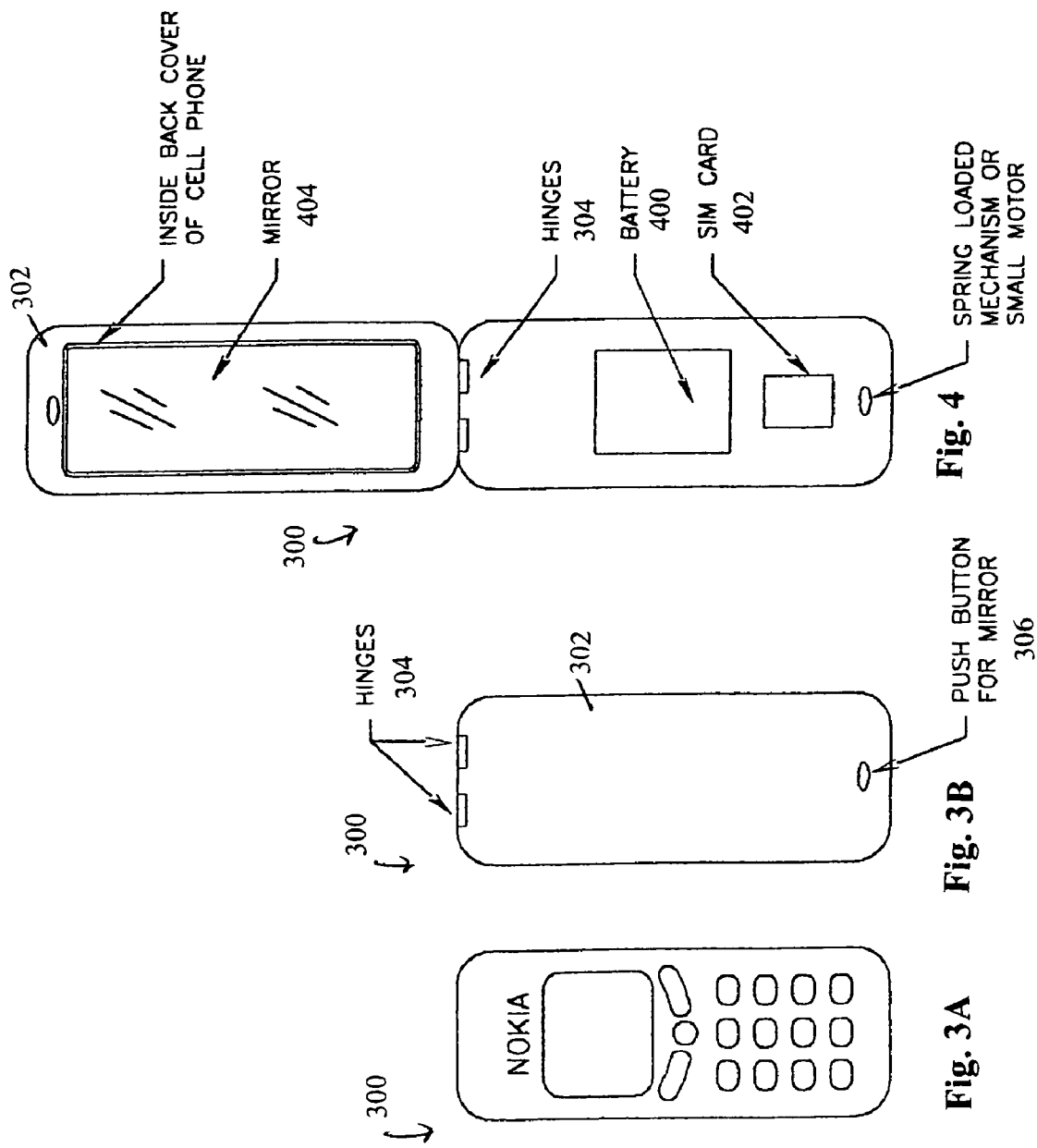

CELL PHONE WITH MIRROR

RELATED APPLICATIONS

This application claims the benefit of U.S. Provisional Appl. Ser. No. 60/482,548, filed Jun. 24, 2003.

FIELD OF THE INVENTION

The present invention relates to cellular telephones, and in particular to such phones having a mirror.

DESCRIPTION OF RELATED ART

Cellular telephones have become increasingly popular in today's society, as almost everyone now seems to own a cellular telephone or cell phone. As a result, people have a tendency also to carry their cell phones everywhere they go. However, people typically do not like to carry large sizes or numbers of items. Thus, it is desirable to make items smaller and smaller, as evidenced by the ever decreasing sizes of cell phones.

To reduce the number of items people must or want to carry every day, different items can be combined into one item. For example, combining a mirror with a cell phone reduces the number of items people must carry. A mirror is desirable for several reasons, including allowing the person to 1) look at the person's face or appearance, such as before meeting someone, 2) use the mirror as a signaling device if the person is in a remote area, and 3) use the mirror as a cutting surface. U.S. Pat. No. 6,424,823, entitled "Cell Phone with Integrated Personal Mirror" (the '823 patent), discloses combining a built-in personal mirror with a cell phone. The '823 patent discloses a mirror on the inside of a handset cover, where the handset cover folds to cover the mirror with the keyboard. The mirror can be a cover of a compartment or simply mounted on the surface of the handset cover. The '823 patent further discloses that the mirror may cover a portion of the reverse side of the handset case.

However, there are several disadvantages to the arrangement of the '823 patent. First, to access the mirror, the user must open the cell phone by flipping open the cover. In many cell phones, this could cause the cell phone user to answer an incoming call, which they may not want to do. Second, because the front of the handset has many other elements, such as an illuminated display and keys, a mirror mounted in the front of the handset may interfere with a person's ability to focus or clearly see the reflection. Third, the mirror shown in the '823 patent arrangement must be kept small in size, as it must share the same general space as other elements of the cell phone. Fourth, the uses of such a mirror may be limited, such as for a cutting board, since it may be awkward to use it for this function based on the spatial orientation of the mirror. Fifth, if the mirror were to cover a portion of the reverse side of the handset cover, the mirror is exposed and may be damaged due to incidental contact with hard objects or it may be dirty from exposure to natural and man-made elements, such as dirt, food, etc.

Accordingly, there is a need for a cell phone with a mirror that overcomes the disadvantages discussed above with respect to conventional systems.

SUMMARY OF THE INVENTION

According to one aspect of the invention, a mirror is placed on the back side of a cell phone on a separate structure, where it is covered until ready for use. In one embodiment, the mirror is accessed by sliding a back cover of the cell phone open to release the back cover containing the mirror, flipping the back cover over, and clipping or otherwise attaching the cover to a side or upper/lower edge of the cell phone. After the mirror use is completed, the back cover can be detached, flipped over, and slid back over the cell phone back. In this position, the mirror is facing the inside of cell phone and protected from damage. In another embodiment, the mirror is accessed by engaging a release button on the cell phone, causing a back cover of the cell phone to flip open, exposing the mirror contained on the inner side of the back cover. After use, the back cover can be pressed back toward the cell phone to secure it in place. Mechanisms for opening and closing the cover can be a spring and latch.

The present invention allows a cell phone carrier to have access to a mirror that may be as big as the size of the cell phone. Further, the mirror can be accessed without any danger of answering an incoming call. The mirror is also protected from damage from external elements because when the mirror is not in use, it is not exposed to the elements. Finally, the mirror, and in particular, when the mirror is on a detachable slide, is more readily used as a reflecting device or cutting surface.

The present invention will be more fully understood upon consideration of the detailed description below, taken together with the accompanying drawings.

BRIEF DESCRIPTION OF THE DRAWINGS

FIGS. 1A and 1B show front and back sides, respectively, of a cell phone with a mirror when the mirror is not exposed according to one embodiment;

FIG. 2 shows a view of the back of the cell phone of FIGS. 1A and 1B when the mirror is exposed;

FIGS. 3A and 3B show front and back sides, respectively, of a cell phone with a mirror when the mirror is not exposed according to another embodiment of the invention; and FIG. 4 shows a view of the back of the cell phone of FIGS. 3A and 3B when the mirror is exposed.

Use of the same reference symbols in different figures indicates similar or identical items.

DETAILED DESCRIPTION OF THE PREFERRED EMBODIMENTS

FIGS. 1A and 1B show front and back views, respectively, of a cell phone 100 with a mirror according to one embodiment of the present invention. FIG. 1A shows a typical front face of cell phone 100, such as a Nokia phone. FIG. 1B shows the back side of cell phone 100, which includes a grip area 102 and a clip area 104. In one embodiment, clip area 104 is located at the top of cell phone 100, although clip area 104 may also be located at the bottom or sides of the cell phone. Grip area 102 allows the user to press and push grip area 102 to slide a back cover 106 from cell phone 100. Grip area 102 can be formed directly on the back cover as ridges or bumps, or a separate protrusion can be secured to the back cover, such as a piece of rubber, felt, or any other suitable material. By pushing on grip area 102, the back cover slides off the cell phone. Note that grip area 102 may be located on any area of cell phone 100 that allows the user to slide off back cover 106.

FIG. 2 shows the back of the cell phone 100 when back cover 106 has been slid off and attached to clip area 104. First, when back cover 106 is slid off, an inside portion of the cell phone is exposed, such as a battery 200 and a SIM card 202. Once back cover 106 is removed, it is flipped over, exposing a mirror 204 or other reflecting device. Mirror 204 is on the opposite side of back cover 106 from grip area 102. Once separated and flipped over, back cover 106 can be attached to cell phone 100 via clip area 104. Any suitable clipping mechanisms may be used. Further, in other embodiments, back cover 106 need not be clipped or there does not need to be a clip area 104 at all. In these embodiments, mirror 204 is not attached to cell phone 100, but can be used independently of the cell phone. As shown in FIG. 2, mirror 204 is nearly the same size as cell phone 100, although any shape and size may be suitable, as long as the mirror is within the outer edges of the cell phone. Further, if a latch is used, mirror 204 may be secured at any angle to front of the cell phone. Some embodiments require a fixed angle, while other embodiments may allow the user to adjust the angle.

Also, in other embodiments, clip area 104 may be on the bottom or sides of cell phone 100. In these embodiments, mirror 204 will be then positioned in a different arrangement relative to the cell phone. Again, clip area 104 in these embodiments do not need to actually attach to back cover 106 to realize the advantages of the present invention.

FIGS. 3A and 3B show front and back views of a cell phone 300 according to another embodiment of the present invention. In this embodiment, cell phone 300 has a front portion similar to the other embodiment, e.g., just a typical cell phone, such as one from Nokia. In FIG. 3B, a back cover 302 is connected to cell phone 300 by a hinge or hinges 304. A push button 306 releases back cover 302 from cell phone 300, such that back cover 302 flips open about hinges 304. Such mechanisms for opening back cover 302 are known, e.g., use of a spring that provides force to push the back cover away from the cell phone and which actually forces the back cover open by pivoting along hinges 304 when a latch or other securing device is released.

FIG. 4 shows the back of cell phone 300 when back cover 302 is opened. As seen, once back cover 302 is "popped" or "flipped" open, an interior portion of cell phone 300 is exposed, such as a battery 400 and SIM card 402. Back cover 302 pivots about hinges 304 such that the interior portion of back cover 302 is exposed to reveal a mirror 404 or other reflecting device. As with the other embodiment of FIGS. 1 and 2, mirror 404 can be any size, but advantageously is capable of being the size of almost the whole cell phone. A spring force in hinges 304 may keep back cover 302 (and mirror 404) in a semi-fixed position so that the cover does not move freely. Once the mirror is not longer needed, the user can close back cover 302 until a securing mechanism locks the cover in place.

In other embodiments, a spring is not present to force the cover open. A latch or release mechanism simply allows the user to then open the back cover manually to expose the mirror, similar in operation to a woman's compact.

Those skilled in the art will recognize that many modifications are possible with the present invention, in which a mirror is located on a separate back portion of a cell phone, where the mirror is covered when not in use.

Although the invention has been described with reference to particular embodiments, the description is only an example of the invention's application and should not be taken as a limitation. Consequently, various adaptations and combinations of features of the embodiments disclosed are within the scope of the invention as defined by the following claims.

I claim:

1. A cellular telephone, comprising:
   a front portion;
   a detachable back cover comprising a mirror, wherein the mirror is exposed when the back cover is detached, and wherein the mirror is directly facing and adjacent to a SIM card when the back cover is closed; and
   a release mechanism for detaching the back cover.

2. The cellular telephone of claim 1, wherein the back cover has approximately the same length and height as the cellular telephone, and wherein the mirror is approximately the same size as or slightly smaller than the back cover.

3. The cellular telephone of claim 1, wherein the mirror faces inward toward the cellular telephone when the back cover is not detached.

4. The cellular telephone of claim 1, wherein the back cover is slidably detachable.

5. The cellular telephone of claim 1, wherein the back cover can be attached to the front portion by a clip.

6. The cellular telephone of claim 5, wherein the latch is located on one of the four sides of the cellular telephone.

7. The cellular telephone of claim 1, wherein the back cover can be completely removed from the front portion.

8. The cellular telephone of claim 1, further comprising a hinge attaching the front portion to the back cover.

9. The cellular telephone of claim 1, further comprising a spring mechanism coupling the front portion with the back cover.

10. The cellular telephone of claim 1, wherein the release mechanism is a sliding mechanism.

11. The cellular telephone of claim 1, wherein the release mechanism is a latch.

12. The cellular telephone of claim 1, wherein the mirror is approximately the same shape as the back cover.

* * * * *